United States Patent
Lisimaque

(10) Patent No.: US 7,043,642 B1
(45) Date of Patent: May 9, 2006

(54) PROCESS TO MANAGE DATA IN A CHIP CARD

(75) Inventor: Gilles Lisimaque, Potomac, MD (US)

(73) Assignee: Gemplus, Gemenos Cedex (FR)

( * ) Notice: Subject to any disclaimer, the term of this patent is extended or adjusted under 35 U.S.C. 154(b) by 0 days.

(21) Appl. No.: 09/576,412

(22) Filed: May 22, 2000

(51) Int. Cl.
H04K 9/32 (2006.01)
H04L 9/00 (2006.01)

(52) U.S. Cl. ............... 713/189; 713/192; 713/193; 380/277; 380/44; 726/9

(58) Field of Classification Search ............... 713/193, 713/184, 182, 202, 201, 200, 189, 192, 183; 705/52; 235/380, 382, 382.5; 395/187; 380/279, 23, 44, 277; 726/5, 9, 18, 20
See application file for complete search history.

(56) References Cited

U.S. PATENT DOCUMENTS

| | | | | |
|---|---|---|---|---|
| 5,060,263 A | * | 10/1991 | Bosen et al. | 713/184 |
| 5,162,638 A | * | 11/1992 | Diehl et al. | 235/380 |
| 5,204,512 A | * | 4/1993 | Ieki et al. | 235/382 |
| 5,298,724 A | * | 3/1994 | Wratil | 235/380 |
| 5,602,915 A | * | 2/1997 | Campana et al. | 380/277 |
| 5,694,471 A | * | 12/1997 | Chen et al. | 705/76 |
| 5,856,659 A | * | 1/1999 | Drupsteen et al. | 235/380 |
| 6,073,238 A | * | 6/2000 | Drupsteen | 713/200 |

FOREIGN PATENT DOCUMENTS

| | | |
|---|---|---|
| EP | 0224147 A2 | 6/1987 |
| EP | 0402301 A1 * | 12/1990 |
| EP | 0426541 A1 | 5/1991 |
| EP | 0671712 A1 | 9/1995 |
| WO | WO94/16415 | 7/1994 |

OTHER PUBLICATIONS

Peyret et al, Smart Cards Provide Very High Secuirty and Flexibility in Subscribers Management, Aug. 1990, IEEE, vol. 36 No. 3, pp. 744-752.*

* cited by examiner

Primary Examiner—Hosuk Song
Assistant Examiner—Beemnet W Dada
(74) Attorney, Agent, or Firm—Buchanan Ingersoll PC

(57) ABSTRACT

The invention concerns a method for duplicating data contained a smart card memory in the memory of another smart card, which consists in producing for said other card another management code, another secret code. Said other management code is produced on the basis of identification data particular to the first card and also particular to the second card. For the system to operate, identification data concerning the first card are also recorded in the second card.

17 Claims, 2 Drawing Sheets

PROCESS TO MANAGE DATA IN A CHIP CARD

This disclosure is based upon, and claims priority from, French Application No. 97/14802, filed Nov. 25, 1997 and International Application No. PCT/FR98/02510, filed Nov. 24, 1998, the contents of which are incorporated herein by reference.

FIELD OF THE INVENTION

The aim of this invention is a process to manage data stored in a chip card. The invention concerns the transfer of data from one card to another, particularly in the case where the original card is on the point of expiry and has to be replaced by a card with extended duration and also having similar system options, the same data recorded in the electronic circuit.

BACKGROUND OF THE INVENTION

Thus for example electronic purses are already known in the field of chip cards, or more generally portable equipment with a computer chip. In such uses monetary units stored in the memory of a chip card are transferred to another and withdrawn from the first. There is on the face of it no limit to validity. Also in the banking sector chip cards, the card body of which is clearly embossed with the expiry date of the card, are known. This precaution of limiting the validity of the card has two objectives. On the one hand it allows the age of the electronic circuits to be taken into account and to facilitate its replacement. On the other hand it gives rise to the return of the cards in circulation to the supervisory body in such a way that this body can totally control the means which it makes available to carry out transactions.

With the exponential development of applications controlled by uses of the chip card, expired chip cards may no longer need to be replaced by a supervisory body: it ought to be possible to do this on site, if necessary with common chip card readers/recorders.

The principles of using chip cards include the requirement to compose a secret code or personal identity number (PIN) and comparison of this code with a code stored in the memory of the chip. If this comparison is successful, the application i.e. in practical terms goods or services corresponding to the transaction can be obtained, or even a payment can be effected with the card. If not the case a reject situation is indicated to the carrier. This comparison is implemented in a fail-safe manner.

The problem which occurs when the requirement is to transfer data from one card to another is a problem of managing these secret codes or, more generally, management codes which allow management under the control of data stored in the memory of the cards. In fact these codes stored in one form or another in the memory of the chip card are produced by the supervisory body according to data capable of identifying the card and particular to this body. As a result it is impossible to arrange the automatic extension of the validity of the cards by replacing expired cards with cards with longer memory without the intervention of this body. Indeed such an operation would amount to disclosing all the secrets concerning the formulation of the secret codes and particular to this body to all the other organizations or even all the readers capable of arranging this extension.

However the aim of the invention is to remedy this future problem by instituting a recording procedure for the management codes. The procedure takes into account the previous management codes or at least data relating to the old cards from which the data are to be recorded into the new originates.

SUMMARY OF THE INVENTION

According to the invention a cryptographic algorithm is used to produce a new management code which on the one hand takes into account identification data of the new card and on the other hand information relating to the old card. In a particular case the data relating to the old card will be the identification data of the old card. In another case the management code of the old card itself will be used. Any other data relating to the old card can be used.

At the moment of use the user can be asked to compose a secret code which corresponds to the management code of the second card. In certain cases of special verification he can also be asked to compose, in a second stage or first stage, a secret code corresponding to the management code of the first card in order to check the coherence of the formulation of the second management code.

Therefore the aim of the invention is a process to manage data stored in a first memory of a first chip of a first chip card in which:

A first management code is produced with a first cryptographic algorithm based on a mother key and a first set of identification data of the first chip card.

This first management code is recorded in the first memory,

The first card is inserted into a chip card reader, and

Editing of the data stored in the first memory is authorized if a code presented to the reader is compatible with the first management code recorded. The invention is characterized in that A second management code is produced with a second cryptographic algorithm based on data relating to the first card and a second set of identification data of a second chip card, This data relating to the first card and this second management code is recorded in a second memory of a second chip of the second chip card, and Editing of the data stored in the second memory is authorized if a secret code presented to the reader is compatible with the second management code recorded.

BRIEF DESCRIPTION OF THE DRAWINGS

The invention will be better understood after reading the description below and after examining the figures which accompany it. The latter are only given as a guide and in no way limit the invention. The figures are detailed as follows.

DETAILED DESCRIPTION

Figure 1:
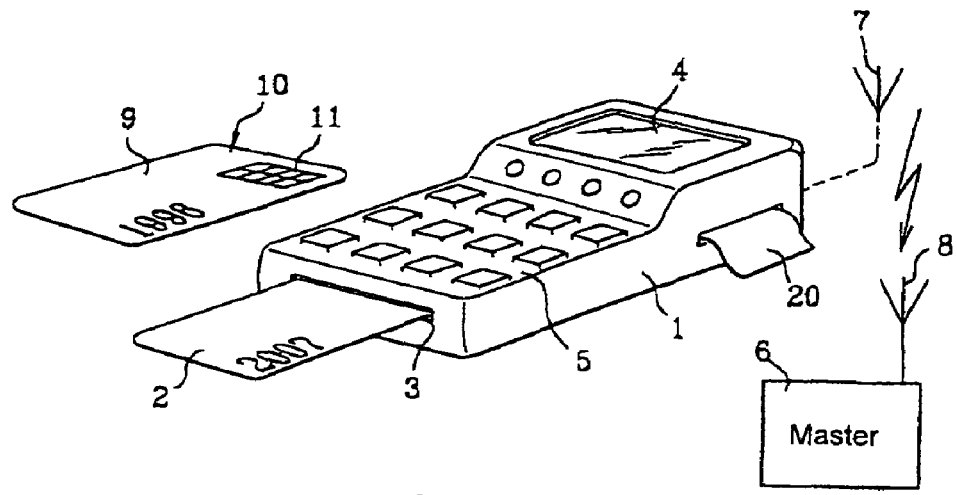
FIG. 1: a diagrammatic illustration of a device which can be used to implement the process of the invention.

FIG. 1 shows a device which can be used to implement the process of managing data according to the invention. This figure shows a reader 1 to read portable equipment 2 with a chip card or a chip card inserted in a slot 3 of the reader. This reader, in a conventional way, has a screen 4 to display messages written by the reader and a key-pad 5 to allow an operator, the carrier of the card, to arrange a transaction between reader 1 and chip card 2. In an example the reader can be linked by various means to a master system 6, either in real or delayed time. In an example these means can include a radio link using two antennas 7 and 8 and their associated transmission/reception system, linked to the reader and master system respectively.

Figure 2:
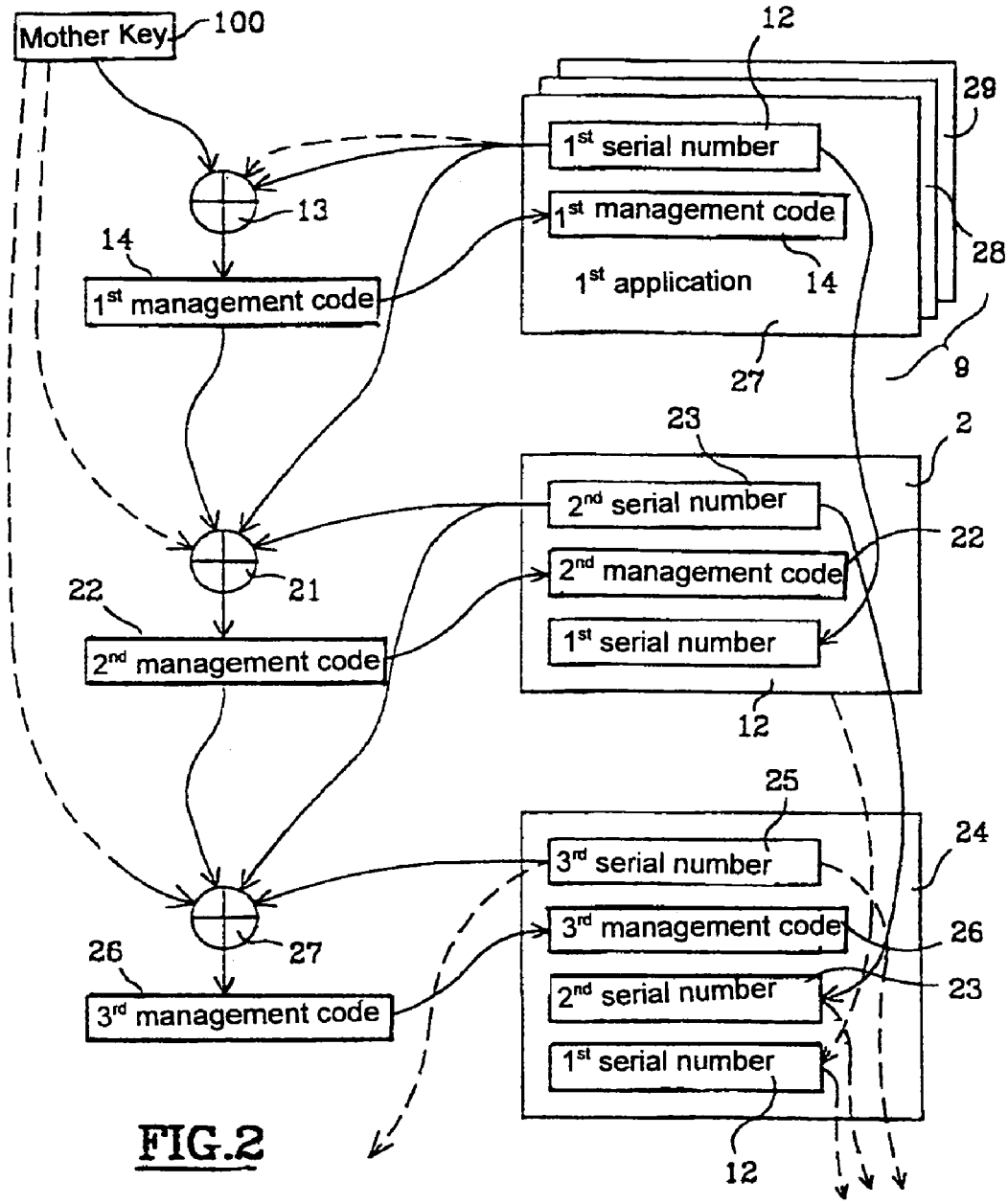
FIG. 2: essential stages for implementing the process of the invention.

The invention concerns more particularly the transfer of data contained in an expired chip card 9 (its expiry date being for example 1996, already out-of-date) and a new chip card 2 with a much later expiry date (2007). Card 9 as well as card 2 each contain a computer chip, such as that referenced 10, and means of linking up with reader 1. In an example these means of linking up with the reader are quite simply a connector 11. Other solutions of linking up are known. In FIG. 2 the stages of the process of the invention are shown in a more detailed way. The old chip card 9 and the new chip card 2 are both illustrated. The chip card contains data 12 recorded in a memory of the chip, representing a serial number of the card or chip. In a banking application this serial number can also be or correspond to a bank account number.

The principle of formulating a management code consists of using a mother key 100. A mother key is thus a chain of binary characters: in an example a mother key has a length of 1024 bits. The serial number of the card or the chip can also be presented in binary form. The two chains of corresponding binary characters are then presented to a cryptographic algorithm represented symbolically by reference 13. Cryptographic algorithm 13 results in the production of a first management code. In an example cryptographic algorithm 13 is implemented by the master system, available at an issuer of the card, before this issuer decides to send the chip card to its user. In the course of a procedure known as personalisation, the issuer reads the serial number of the card with a special chip card reader and produces a first management code 14 with an algorithm 13 and a mother key 100 known by the issuer alone. The master system records the first management code 14 in the memory of the chip of the card. In a known way this can be recorded in a place of the chip of card 9. This place can also depend for its position on the application, first application 27, controllable with the card. Preferably the management codes are therefore secret and stored in places which cannot be violated.

Figure 3:
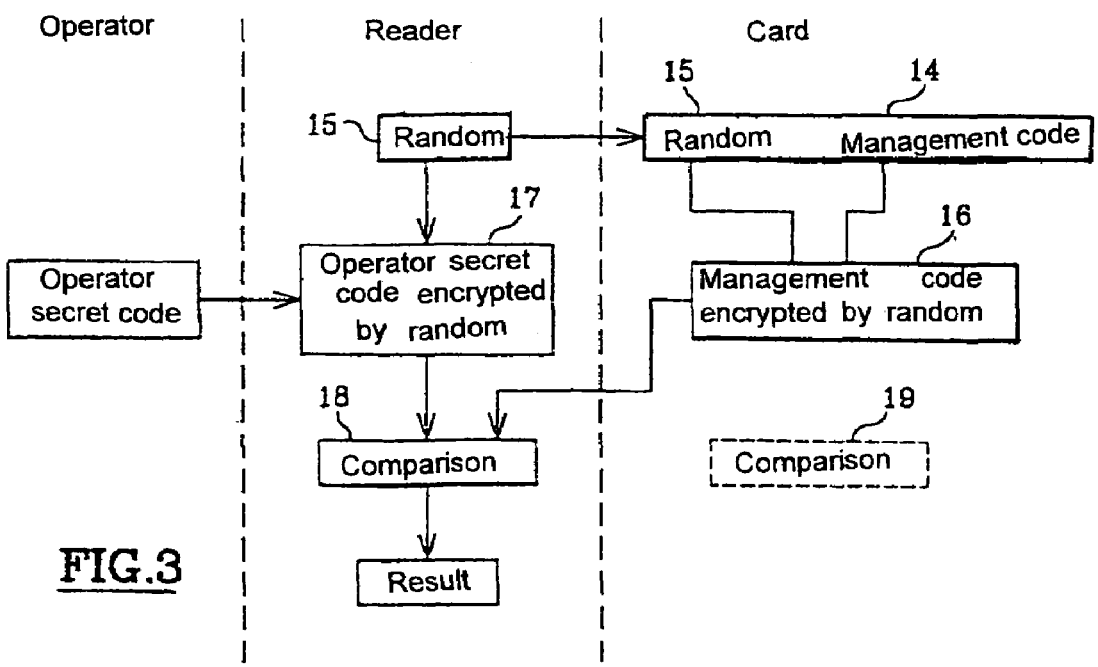
FIG. 3: preferred method to check the legality of the holding of a chip card by a carrier.

FIG. 3 shows a preferred method for using a chip card or portable equipment with a chip equipped for an application such as a management code 14.

When an operator, a user, inserts his chip card into reader 1, the latter produces a random chain of bits 15. This random chain of bits 15 is sent especially by means of connector 11 to chip card 9. The latter then starts to encrypt the random chain of bits 15 by the management code 14 and produces a management code 16 encrypted by the random chain of bits. At the same time the operator composes a secret code on keypad 5. This secret code is sent to reader 1. Reader 1, in the same way as card 9, produces the encryption 17 of the secret code by the value of the random chain of bits 15 which this reader knows. A comparison circuit 18 of the reader unless the latter is a comparison circuit 19 of the card, compares the management code 16 encrypted by the random chain of bits with secret code 17 encrypted by the random chain of bits. If this is identical the result of the comparison circuit 18 or 19 will be positive and the progress of the transaction planned with card 9 can continue.

Notably this progress of transactions will include editing the data stored in the first memory of the first card 9 if the secret code presented to the reader is compatible with the first management code 14 recorded.

In fact the reader will on the one hand often produce a ticket 20 representing the transaction or on the other hand in a non-obvious way make a record in its memory to represent this transaction. This record is itself intended to be transmitted to the master system in delayed mode or in real time.

Ticket 20 as well as the record will include details of the transaction, notably at least a way of identifying chip card 2, for example serial number 12 envisaged up till now, or an account number or any other information recorded in card 9. The sole fact that this information appears on ticket 20 or on the record of reader 1 signifies that it has also been edited. In practical terms an attempt is made in fact with the comparison to prevent or allow such editing and therefore the continuation of the transaction.

In the invention it has been considered that a card 9 was concerned and transferring the contents of chip 10 of this card 9 into a chip of a new card 2 was wanted. According to the invention a second management code 22 is produced with an algorithm 21, based on data relating to card 9 and a set of identification data of the second card 2.

In a particular example the information relating to the first card is rightly the serial number 12 and the information relating to the second card 9 is equally a serial number 23 of this second card. However the first management code 14 or any other information could be used as data relating to the first card.

In the invention algorithm 21 is implemented by a common-type reader 1 but equipped with software for the purpose, during a session to produce code 22, of reading useful data in card 9, requesting extraction of card 9 and putting into place card 2 as a replacement, reading useful identification data in card 2, calculating code 22 and recording it in card 2. To simplify such production of management codes, the software for implementing the algorithm can, at least partly, be stored in card 9 (or in card 2). It can even be implemented by the micro-processor of the card for greater security.

To simplify the explanation it was considered that algorithm 21 needed to receive three chains of characters. Algorithm 13 preferably will receive the first serial number 12, a second time the first serial number 12 as well as mother key 100. In an example algorithm 21 is the same as algorithm 13. For algorithm 21 the three items of useful data can be serial number 23, serial number 12 and mother key 100. This key 100 can even be replaced by code 14. Therefore according to the invention a second management code 22 is produced with the second cryptographic algorithm 21. The second management code 22 produced in this way is then recorded in the second card 2 at the same time as the data relating to the first card (12 or 14) which has served to formulate this second management code. In the example serial number 12 of the first card 9 is also recorded in the second card 2.

FIG. 2 shows again that the mechanism can be extended from the time when a third chip card 24 equipped with a third serial number 25 is used. Then it will be possible with this third card 24 to produce a third management code 26 under the same conditions with an algorithm 27 similar to algorithm 21. In this case the data relating to the second card 2: serial number 23 will be stored in the memory of the third card 24. However it is also possible to want to store data relating to the first card 9, i.e. serial number 12 in the third card 24.

A first application 27 has been illustrated for card 9. This application is an initial way to use card 9. This card 9 according to the invention can preferably be a multi-application card. In this case management code 14 is a management code intended for one application. For other applications 28 or 29 the same items will be found. Nevertheless while the same serial number 12 (common to the whole card or whole chip) can be used, the other management codes will benefit from being different. This can easily be achieved by using algorithms 13 programmed by different mother keys 100, depending on the applications concerned. Mother key 100 can also be stored in card 9 in the place of the memory zone reserved for applications 27, 28 or 29. Algorithm 13 is then programmed by a key 100 which depends on the application.

As soon as it is confirmed that the carrier of card 2 is a good carrier, reader 1 and chip card 2 exchange information as shown in FIG. 2. In this case however the management code concerned is now code 22 relating to the second card and no longer code 14 relating to the first. The operator must therefore compose a secret code corresponding to code 22.

It is possible according to the invention to check that the second card 2 is a legitimate successor for the contents of the first card 9. This check can be made on request by having reader 1, or alternatively chip card 2, execute corresponding encryption operations, on the one hand, by algorithm 13 and on the other hand by algorithms 16 and 17. The operator must therefore compose a secret code corresponding to code 22. In other words, based on the first serial number 14 available in the second card 2, it is possible—conforming to the information given for the top of FIG. 2—to again find the first management code 14. Then, provided with this management code 14, card 2 can implement algorithm 16 from the random chain of bits. In this case the carrier can be asked to compose not the new secret code but the old secret code. In an example the request to carry out this more complex check could be requested at random, for example on average once every hundred times. Clearly if the check fails the same consequences on the continuation of the transaction will occur.

Figure 4:
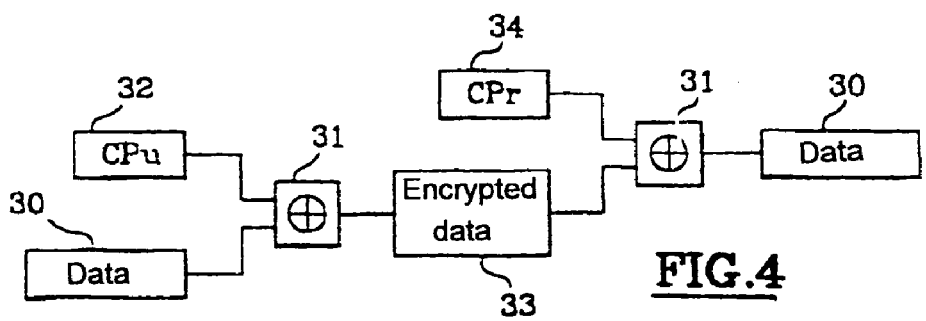
FIG. 4: diagrammatic illustration of a symmetric-type algorithm enabling a management code to be found from a previous management code.

Algorithm 21 will preferably be different from algorithm 13, although it could be the same. If it is different algorithm 21 will preferably be an algorithm known as symmetric. A symmetric algorithm 31 is shown on FIG. 4. The peculiarity of a symmetric algorithm is the use of CPu public keys paired with CPt private keys. The symmetrical character of algorithm 31 then results in the fact that data 30 ciphered in symmetric algorithm 31 by mother key 32 produce encrypted data 33. If these data 33 are themselves encrypted by the same programmed algorithm 31, then by daughter key 34, then the second implementation of algorithm 31 produces source data 30. In an example it is possible to have several different CPt private daughter keys for the same CPu public mother key. Diversification of the keys involves the intervention of the serial number of the cards so that each card possesses a key, a different management code 14. It is clear that if algorithm 13 or algorithm 21 are symmetric algorithms and if data 30 are replaced by serial number 12 then the daughter key 34 itself is obtained as encrypted data.

According to the invention in addition to the data stored in the memory of card 9, a transmission attribute is associated. And editing of these data is authorized notably to allow them to be copied into the second memory, depending on the value of this attribute. If this is the case these data are copied into the second chip card 2 at the same time as this attribute. In practice this attribute gives information about a need to produce a second management code or not when the data are copied. In certain cases the mechanism implemented by algorithms 13 and 21 will be required; in other cases it will not be executed.

In another case the transmission attribute gives information about the need to control data copying by the master system. In this case when the data to be copied is edited, the attribute concerning these is read. If intervention by the master system is required, a connection to master system 6 is made. This data copying can then take place in real or delayed time with or without the data being transmitted to the master system.

The invention claimed is:

1. Process to manage data stored in a first memory of a first chip of a first chip card in which:
   a first management code is produced with a first cryptographic algorithm based on a mother key and a first set of identification data of the first chip card,
   said first management code is recorded in the first memory,
   the first card is linked to a chip card reader, and
   editing of data stored in the first memory is authorized if a secret code presented to the reader is compatible with the recorded first management code,
   wherein the following steps are performed:
   a second management code is produced with a second cryptographic algorithm based on data relating to the first card and a second set of identification data of a second chip card,
   said data relating to the first card and the second management code are recorded in a second memory of a second chip of the second chip card, and
   editing of the data stored in the second memory is authorized if a secret code presented to the reader is compatible with the recorded second management code.

2. The process according to claim 1 wherein the first and second management codes are secret codes.

3. The process according to claim 1 wherein the second algorithm is implemented in the chip of the card.

4. The process according to claim 1 wherein the first cryptographic algorithm is different from the second cryptographic algorithm, and the second cryptographic algorithm is symmetric.

5. The process according to claim 1, wherein the first cryptographic algorithm is the same as the second cryptographic algorithm.

6. The process according to claim 1, wherein the data relating to the first card is the first set of identification data of the first card or the first chip.

7. The process according to claim 1, wherein the data relating to the first card is the first management code of the first card or the first chip.

8. The process according to claim 1 wherein a management code word is produced in the reader on the basis of the data relating to the first card, and a determination is made whether the card is authentic if said management code word is compatible with a secret word.

9. The process according to claim 1 wherein a transmission attribute is associated with the data stored in the first memory, editing of these data is authorized so that they can be copied into the second memory depending on the value of this attribute, these data and this attribute are copied into the second memory, and this attribute gives information about a need to produce a second secret code when copying the data.

10. The process according to claim 9 wherein, in order to authorize editing of data contained in the first memory only under the control of a master system, a transmission attribute which gives information about a need for said control by a master system is associated, this attribute is read prior to editing, and an editing program is started if the attribute having been read allows such control.

11. The process according to claim 9 wherein the transmission attribute inhibits editing with a view to the data concerned being copied.

12. The process according to claim 9 wherein the data is copied into the memory in delayed time.

13. The process according to claim 1, wherein the card is a multi-application card, the data being associated with respective management codes.

14. A method for managing data stored in plural chip cards, comprising the following steps:
   generating a first management code in accordance with a first cryptographic algorithm that is based upon an encryption key and identification data of a first chip card;
   storing said first management code in said first chip card;
   permitting access to data stored in said first chip card only if a code presented by a user is compatible with said first management code;
   generating a second management code in accordance with a second cryptographic algorithm that is based upon data relating to said first chip card and identification data of a second chip card;
   storing said second management code in said second chip card; and
   permitting access to data stored in said second chip card only if a code presented by a user is compatible with said second management code.

15. The method of claim 14 wherein said data relating to said first chip card includes said identification data of said first chip card.

16. The method of claim 14 wherein said data relating to said first chip card includes said first management code.

17. The method of claim 14 further including the steps of:
   storing an attribute in said first chip card in association with said data stored in said first chip card;
   copying said data stored in said first chip card and said attribute to said second chip card;
   detecting the value of said attribute; and
   selectively generating said second management code and storing it in said second chip card in response to the detected value of said attribute.

* * * * *